United States Patent
Lee et al.

(10) Patent No.: US 8,233,795 B2
(45) Date of Patent: Jul. 31, 2012

(54) APPARATUS AND METHOD FOR MEDIUM ACCESS CONTROL IN AN OPTICAL PACKET-SWITCHED NETWORK AND THE NETWORK THEREOF

(75) Inventors: Shi-Wei Lee, Taoyuan (TW); Yu-Min Lin, Hsinchu (TW); Maria C. Yuang, Hsinchu (TW); I-Fen Chao, Hsinchu (TW); Bird C. Lo, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 739 days.

(21) Appl. No.: 12/344,230

(22) Filed: Dec. 25, 2008

(65) Prior Publication Data

US 2010/0034536 A1 Feb. 11, 2010

(30) Foreign Application Priority Data

Aug. 5, 2008 (TW) ................. 97129720 A

(51) Int. Cl.
*H04J 14/00* (2006.01)
(52) U.S. Cl. ............... 398/51; 398/54; 398/45; 398/69
(58) Field of Classification Search .............. 398/43–75; 370/395.21, 395.41
See application file for complete search history.

(56) References Cited

U.S. PATENT DOCUMENTS

| | | | |
|---|---|---|---|
| 5,101,290 A | 3/1992 | Eng et al. | |
| 6,925,259 B2 | 8/2005 | Boroditsky et al. | |
| 7,006,767 B1 | 2/2006 | Frigo et al. | |
| 7,020,162 B2 * | 3/2006 | Iwasaki et al. | 370/468 |
| 7,061,861 B1 * | 6/2006 | Mekkittikul et al. | 370/230 |
| 7,840,692 B1 * | 11/2010 | Monga et al. | 709/232 |
| 7,885,186 B2 * | 2/2011 | MacLean et al. | 370/230.1 |
| 2006/0013133 A1 * | 1/2006 | Peng et al. | 370/230 |

FOREIGN PATENT DOCUMENTS

| | | |
|---|---|---|
| TW | I276334 B | 3/2007 |
| TW | I287365 B | 9/2007 |

(Continued)

OTHER PUBLICATIONS

Metropolitan Area Packet-Switched WDM Networks, vol. 6, No. 2, May 2004: A Survey on Ring Systems, Martin Herzog, Technical University Berlin Martin Maier, Centre Tecnologic De Telecomunicacions De Catalunya (CTTC) Martin Reisslein, Arizona State University, IEEE Communications Surveys & Tutorials • Second Quarter 2004.

(Continued)

*Primary Examiner* — Mohammad R Sedighian
(74) *Attorney, Agent, or Firm* — Lin & Associates IP, Inc.

(57) ABSTRACT

Disclosed is an apparatus and method for medium access control (MAC) in an optical packet-switched network. The MAC apparatus may comprise a bandwidth allocation module and an MAC processor. The bandwidth allocation module determines a data transmission limit based on a probabilistic quota plus credit mechanism for each node of the network, dynamically informs all downstream nodes of unused quota and allows the downstream nodes to use remaining bandwidths of the upstream node. Through a control message carried by a control channel, the MAC processor determines uploading, downloading and data erasing for a plurality of data channels, and updates the corresponding contents in the control message.

19 Claims, 13 Drawing Sheets

FOREIGN PATENT DOCUMENTS

TW    I295887 B    4/2008

OTHER PUBLICATIONS

All-Optical WDM Multi-Rings With Differentiated QoS, Marco Ajmone Marsan, Andrea Bianco, Emilio Leonardi, Alessandro Morabito, and Fabio Neri Politecnico dl Torino, IEEE Communications Magazine, Feb. 1999, p. 58~p. 66.

Efficient QoS Support in a Slotted Multihop WDM Metro Ring, Kemal Bengi, Member, IEEE, and Harmen R. van As, Member, IEEE, IEEE Journal on Selected Areas in Communications, vol. 20, No. 1, Jan. 2002, p. 216~p. 227.

A WDMA Protocol for Multichannel DQDB Networks, Jonathan C. Lu & Leonard Kleinrock, 0-7803-0917-0193$03.0C0a 1993 IEEE, p. 149~p. 153.

A Summary of the HORNET Project: A Next-Generation Metropolitan Area Network, Ian M. White, Member, IEEE, Matthew S. Rogge, Student Member, IEEE, Kapil Shrikhande, and Leonid G. Kazovsky, Fellow, IEEE, IEEE Journal on Selected Areas in Communications, vol. 21, No. 9, Nov. 2003, p. 1478~p. 1494.

Taiwan Patent Office, Office Action, Patent Application Serial No. TW097129720, Apr. 17, 2012.

* cited by examiner

APPARATUS AND METHOD FOR MEDIUM ACCESS CONTROL IN AN OPTICAL PACKET-SWITCHED NETWORK AND THE NETWORK THEREOF

FIELD OF THE INVENTION

The present invention generally relates to an apparatus and method for medium access control (MAC) in an optical packet-switched network, and the network thereof.

BACKGROUND OF THE INVENTION

The metro network is mostly a ring network based on synchronous optical network (SONET) or synchronous digital hierarchy (SDH). Ring network has the advantages of simple network architecture, easy to implement add-drop multiplexers (ADM), and high speed protection switching capability to meet the demands of high survival rate. SONET/SDH networks are circuit switch based networks, and are suitable for constant bit rate (CBR) application, such as voice service. However, the circuit switched based network may suffer network resource waste for other applications, such as data service.

In "A summary of the HORNET Project: A Next-Generation Metropolitan Area Network", White, M. Rogge, K. Shrikhande, and L. Kazovsky disclosed a hybrid optoelectronic ring network (HORNET). HORNET uses the wavelength-division multiplexing (WDM) bi-directional slot ring network architecture of the optical packet switching (OPS) to divide the network nodes into groups. The nodes of a group share an optical wavelength, called home channel of the nodes of the group. Each node has a tunable transmitter and a fixed-tuned receiver of a fixed wavelength, i.e., home channel. FIG. 1 shows an exemplary schematic view of the topology of HORNET.

As shown in FIG. 1, node 1 and node 4 share the purple wavelength $\lambda_p$, node 2 and node 5 share the green wavelength $\lambda_g$, and node 3 and node 6 share the red wavelength $\lambda_r$. In the HORNET architecture, the MAC uses independent control channel for communication and coordination, called distributed queue bidirectional ring (DQBR). DQBR enables the ring network to achieve acceptable network utilization and fairness, and relieves the restriction on the ring network scale.

In the HORNET architecture, the static wavelength distribution manner is used to allocate to the home channel corresponding to each node for receiving packet.

U.S. Pat. No. 6,925,259 disclosed a MAC protocol for optical packet switched ring network. As shown in FIG. 2, the MAC technology uses wavelength stacking to arrange the packets on multiple wavelengths, such as wavelength 1, wavelength 2, and wavelength 3, into a composite packet. The stacking and an admission control with credit-based method are used to transmit data packet. The MAC technology may execute multi-packet transmission. Each node requests to a central admission control node for a transmission quota in advance. When the request is granted, the node may transmit the packets of the quota during per frame period.

The flow size of the data service in recent years has exceeded the voice service, and the difference is growing larger. Therefore, it is imperative to devise a MAC technology suitable for packet-switched metropolitan network with burst traffic to replace the conventional MAC technology of the SONET/SDH network.

SUMMARY OF THE INVENTION

The disclosed embodiments of the present invention may provide an apparatus and method for medium access control (MAC) in an optical packet-switched network and the network thereof.

In an exemplary embodiment of the present invention, the disclosed is directed to an apparatus for MAC, applicable to an optical packet-switched network. The MAC apparatus may comprise a bandwidth allocation module and a MAC processor. The bandwidth allocation module determines a data transmission limit based on a probabilistic quota plus credit mechanism for each node of the network, dynamically informs all downstream nodes of unused quota and allows the downstream nodes to use remaining bandwidths of the upstream node. Through a control message carried by a control channel, the MAC processor determines uploading, downloading and data erasing for a plurality of data channels, and updates the corresponding contents in the control message.

In another exemplary embodiment of the present invention, the disclosed is directed to a method for MAC, applicable to an optical packet-switched network. The method may comprise: determining a data transmission limit for each node of the network by using a probabilistic quota plus credit mechanism; dynamically informing all downstream nodes of unused quota and allowing the downstream nodes to use remaining bandwidths of the upstream node; and determining uploading, downloading and data erasing for a plurality of data channels, and updating the corresponding contents in the control message through a control message carried by a control channel.

Yet in another exemplary embodiment of the present invention, the disclosed is directed to an optical packet-switched network. The optical packet-switched network may comprise a plurality of ordinary nodes, at least a server node, and at least an optical fiber. The optical fiber connects the plurality of ordinary nodes and the server node. Each optical fiber carries a control channel for transmitting control messages and a plurality of data channels for transmitting data packets. Through a MAC apparatus, the network determines a data transmission limit for each node of the network, and dynamically informs all downstream nodes of unused quota and allowing the downstream nodes to use remaining bandwidths of the upstream node by using a probabilistic quota plus credit mechanism.

The foregoing and other features, aspects and advantages of the present invention will become better understood from a careful reading of a detailed description provided herein below with appropriate reference to the accompanying drawings.

DETAILED DESCRIPTION OF THE PREFERRED EMBODIMENTS

The present invention takes a ring optical packet-switched network as example to design the network topology and node system architecture. Based on the exemplary ring network, the disclosed exemplary embodiments of the present invention design an appropriate MAC mechanism. In the disclosed exemplary embodiments, the present invention may provide a MAC apparatus to control optical packet-switched network.

Figure 1:
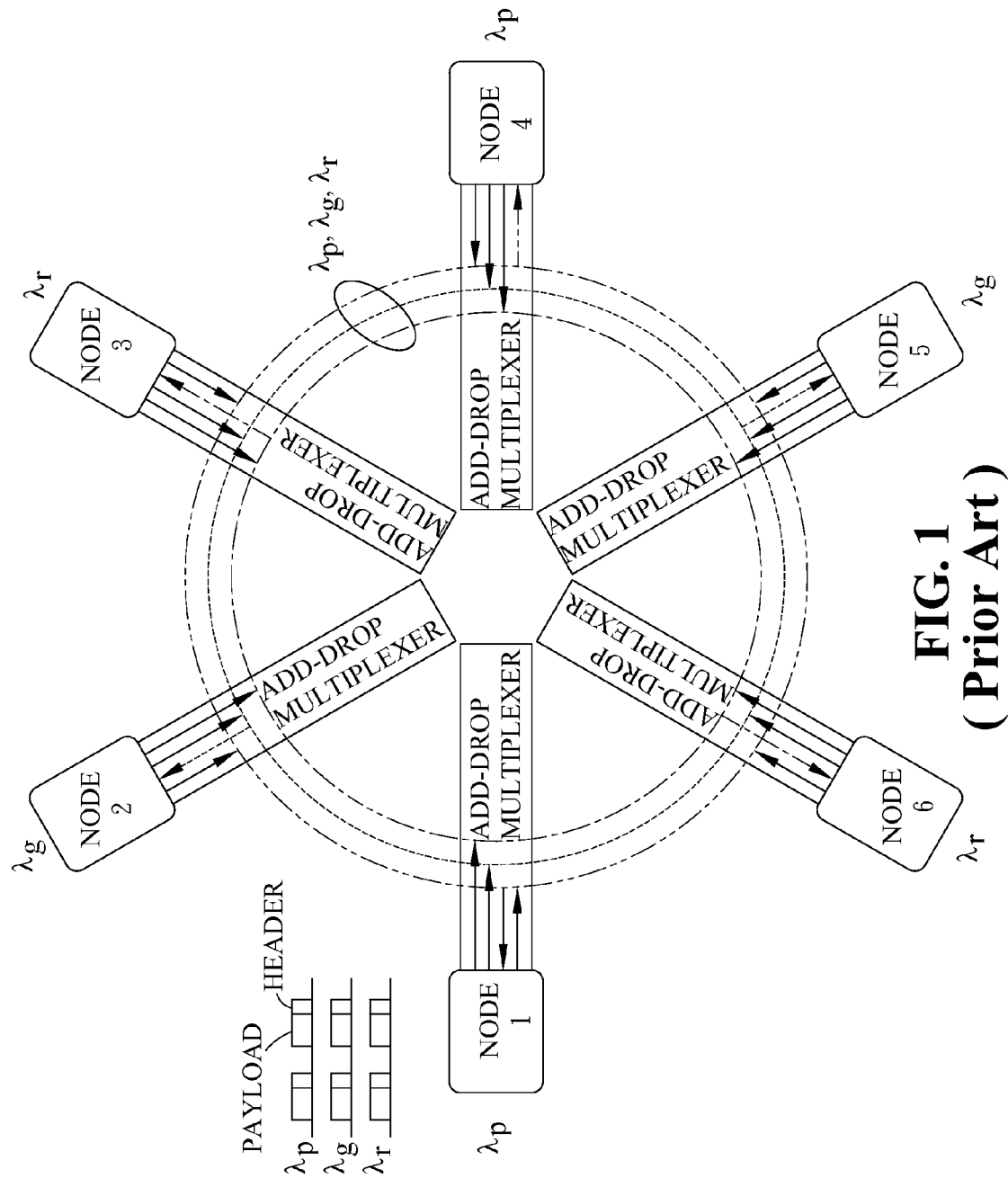
FIG. 1 shows an exemplary schematic view of the topology of HORNET.
Figure 2:
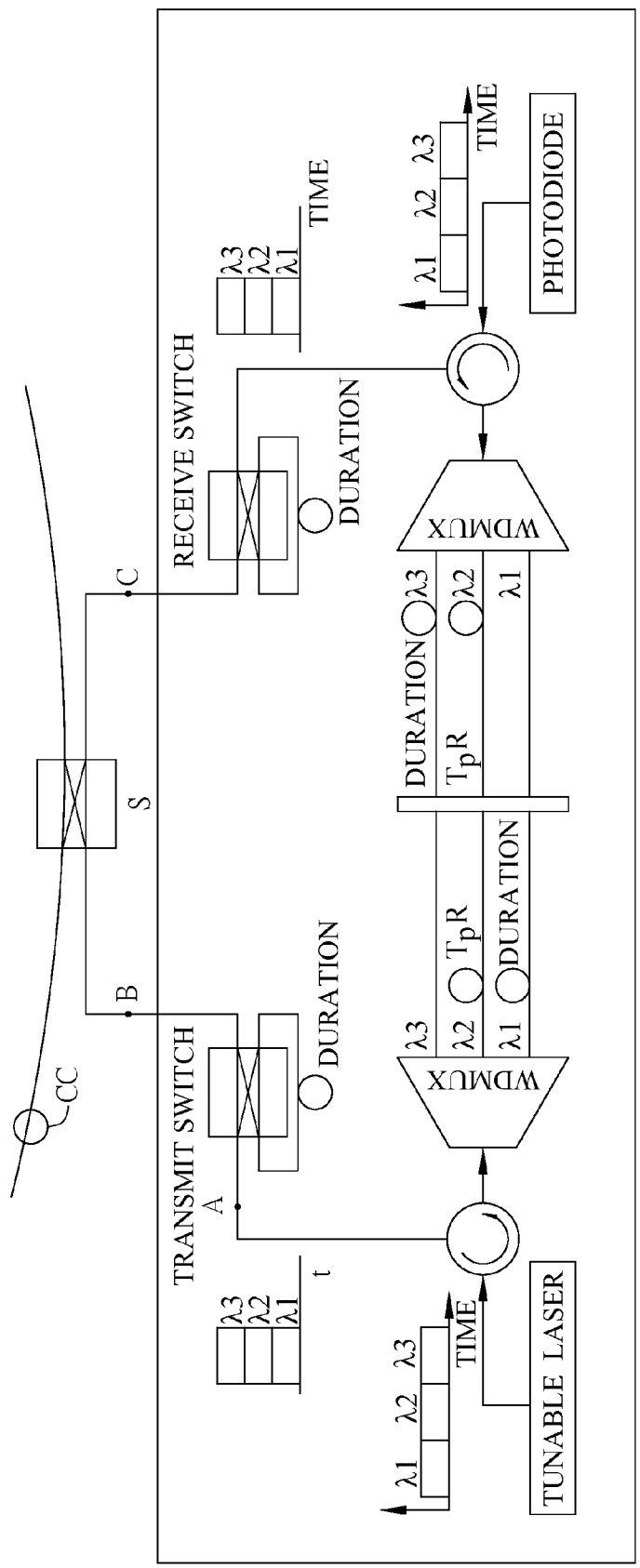
FIG. 2 shows an exemplary schematic view of the MAC technology for a packet-switched ring network.
Figure 3:
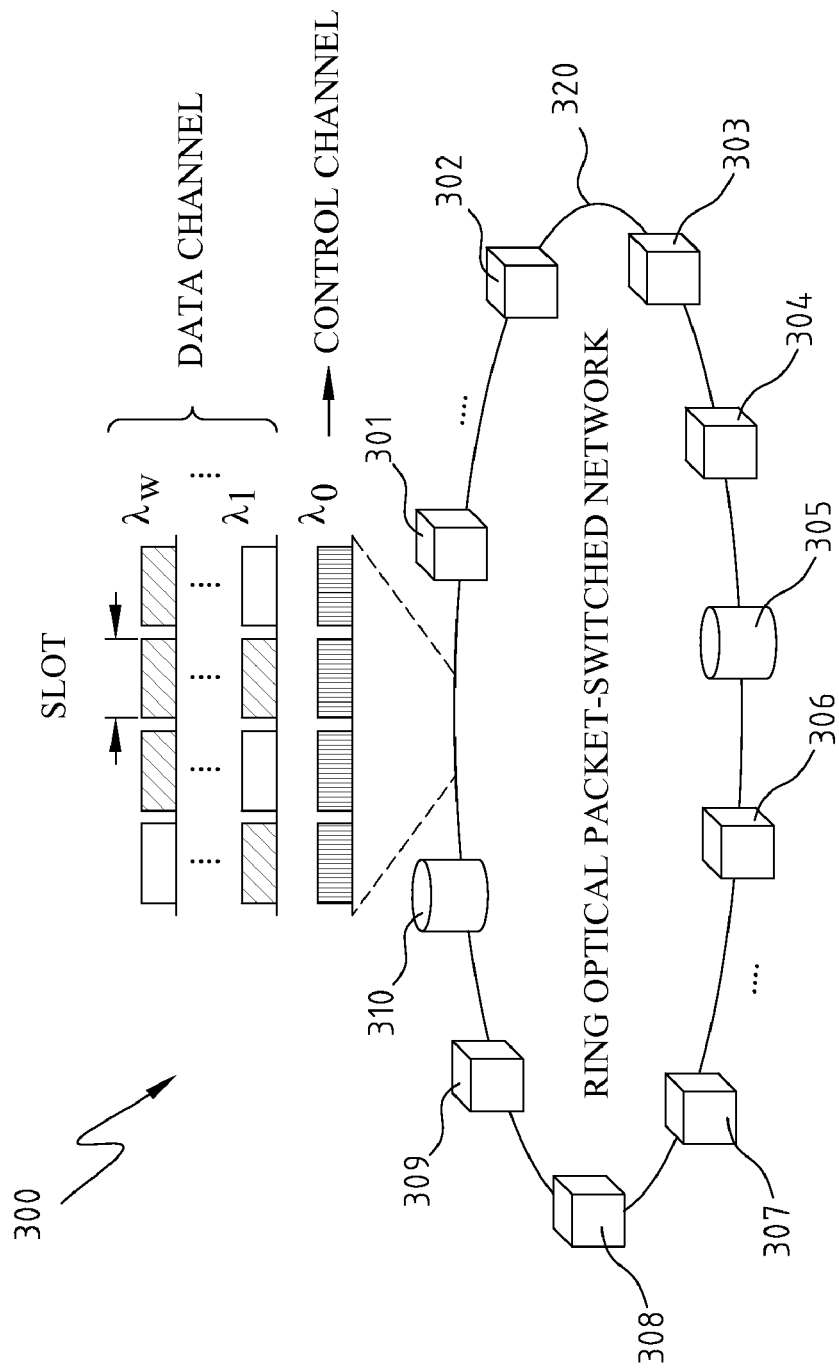
FIG. 3 shows the topology and architecture of an exemplary optical packet-switched ring network, consistent with certain disclosed embodiments of the present invention.

FIG. 3 shows the topology and architecture of an exemplary optical packet-switched ring network, consistent with certain disclosed embodiments of the present invention. As shown in FIG. 3, ring optical packet-switched network 300 comprises a plurality of ordinary nodes and at least a server node. The nodes are connected by an optical fiber 320 to form a ring network. The ordinary node is depicted as a cube, such as node 301-304, nodes 306-309, and the server node is depicted as a cylinder, such as nodes 305, 310. In other words, ring packet-switched network 300 includes two types of nodes, namely, ordinary nodes and server nodes. Optical fiber 320 carries two types of wavelength channels, where one channel is for transmitting control messages and the remaining channels are for transmitting data packets. The channel for transmitting control messages is called control channel, depicted as $\lambda_0$, and the remaining W channels for transmitting data packets are called data channel, depicted as $\lambda_1, \ldots, \lambda_W$, where W is an integer greater than 1. The channels are divided into synchronous time slots.

Figure 4:
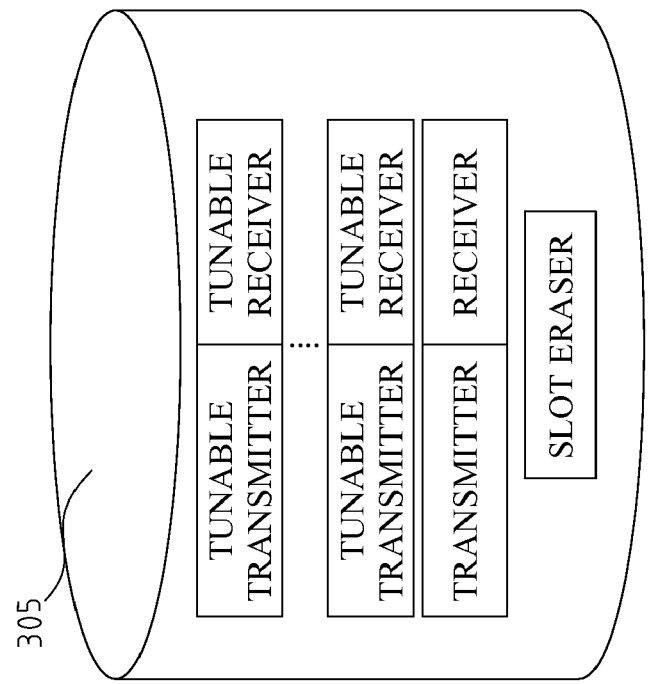
FIG. 4 shows an exemplary schematic view of the ordinary nodes and server nodes of FIG. 3, consistent with certain disclosed embodiments of the present invention.
Figure 4:
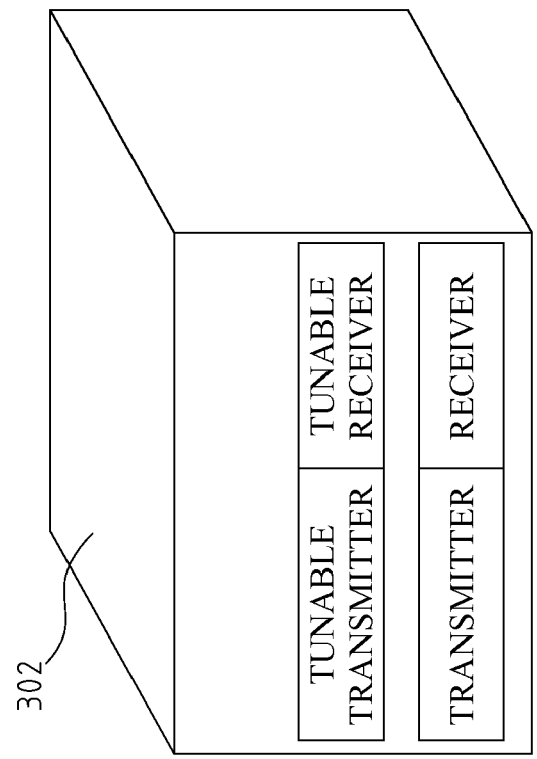

Each ordinary node has a tunable transmitter and a tunable receiver for transmitting and receiving the data packets on wavelengths $\lambda_1, \ldots, \lambda_W$. Each ordinary node also includes a transmitter and a receiver for transmitting and receiving control message of fixed wavelength $\lambda_0$. Each server node has one or more sets of tunable transmitters and receivers (for transmitting and receiving the data packets on wavelengths $\lambda_1, \ldots, \lambda_{W+}$), a set of a transmitter and a receiver (for transmitting and receiving control message of fixed wavelength $\lambda_0$), and a slot eraser. Ordinary node 302 and server node 305 are shown in FIG. 4.

Through data channel, tunable transmitter and tunable receiver may transmit and receive packets, respectively. Therefore, nodes may use tunable transmitters/receivers to directly add/drop the data packet to/from the ring network through the optical layer. Slot eraser on server node 310 may directly erase the already read packets. In this manner, the bandwidth may be reused to improve the bandwidth utilization.

Figure 5:
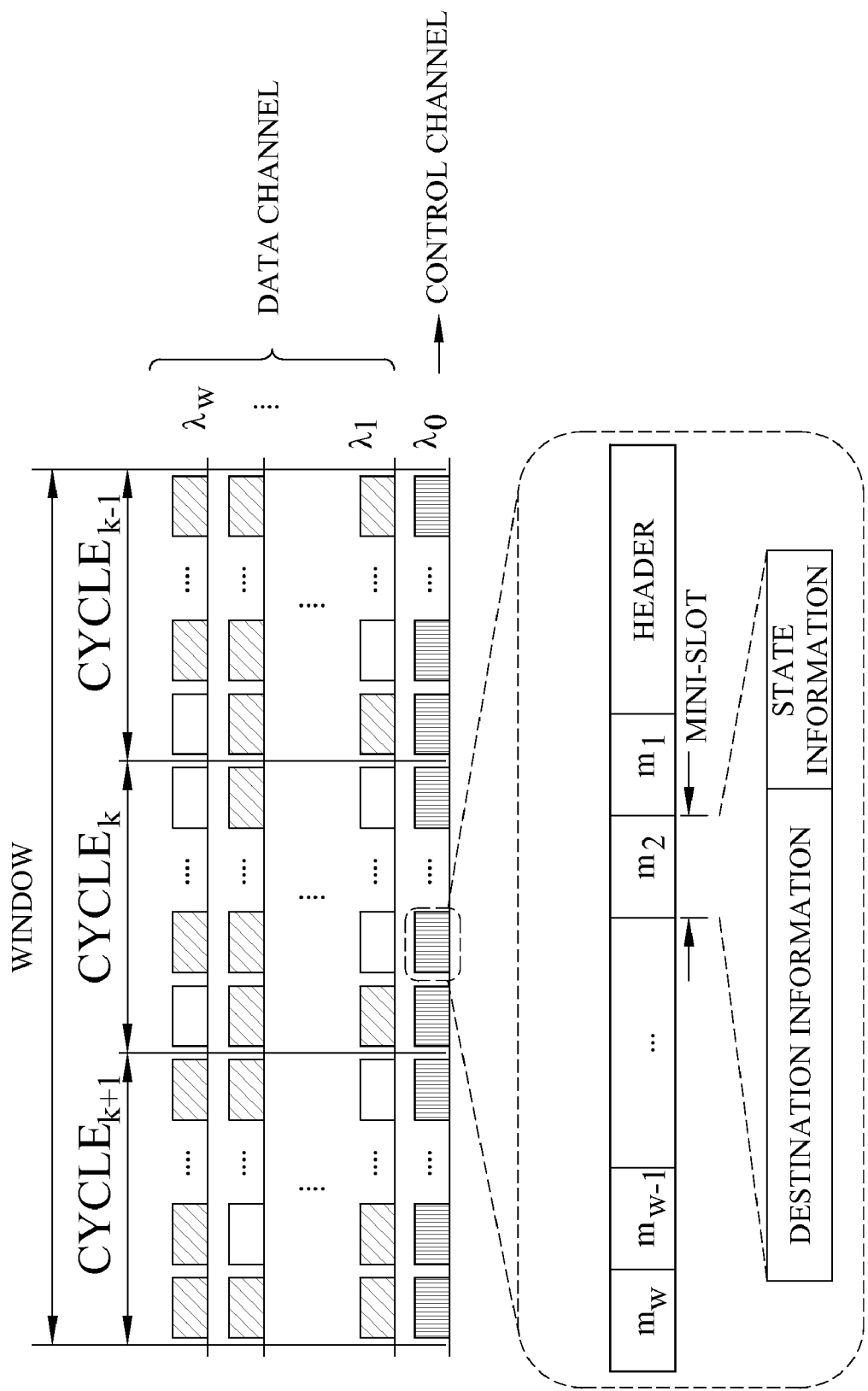
FIG. 5 shows an exemplary schematic view of the relation among the slot, cycle and window of the channels and the specification of the multiple channels in the optical fiber, consistent with certain disclosed embodiments of the present invention.

FIG. 5 shows an exemplary schematic view of the relation among the slot, cycle and window of the channels and the specification of the multiple channels in the optical fiber 320, consistent with certain disclosed embodiments of the present invention. As shown in FIG. 5, each channel of optical fiber 320 is divided into a plurality of time slots of a fixed period. A cycle is defined as a fixed number of slots, and a fixed number of cycles form a window. Cycle and window are both system parameters. During the system operation, both parameters are fixed constant, which may be pre-defined by the system. In other words, in the k+1-th cycle, k-th cycle, or k−1-th cycle, each cycle has a fixed number of slots, where k is a natural number. Similarly, each window has a fixed number of cycles. In each cycle, W+1 channels $\lambda_0, \lambda_1, \ldots, \lambda_W$ are all divided into a plurality of synchronous time slots.

In each data channel, each slot may include a data packet. In control channel $\lambda_0$, each slot includes W mini slots $m_1, m_2, \ldots, m_{W-1}, m_W$ and a header. The W mini slots record the state of the W data channels in the same slot, respectively. Therefore, in the ring packet-switched network, each node may know whether the slot of each data channel carries a data packet and the destination of the data packet through the message carried by control channel $\lambda_0$. The data structure of the slot of control channel $\lambda_0$ is described in details in FIG. 8.

Figure 6:
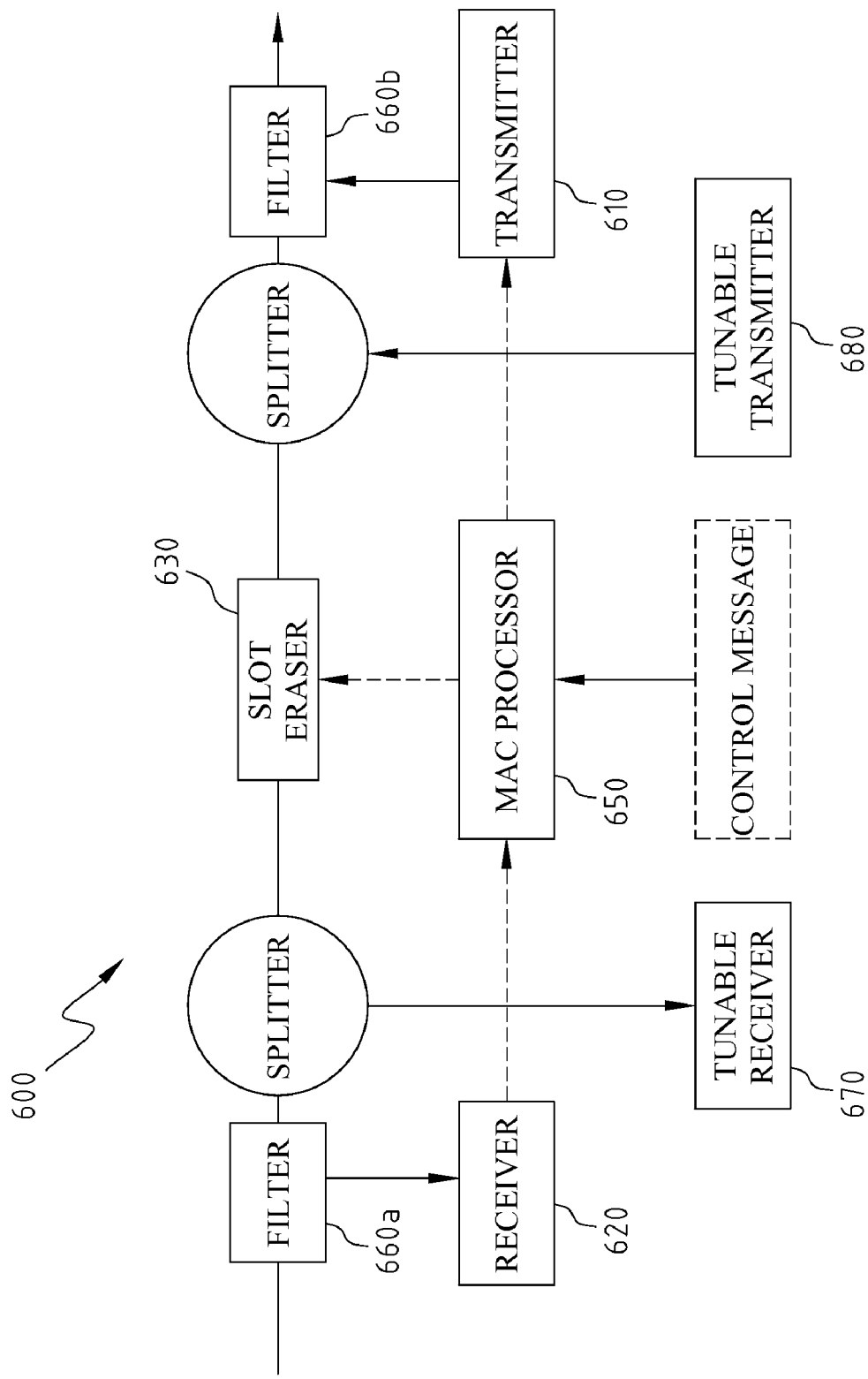
FIG. 6 shows an exemplary schematic view of the MAC mechanism of the network node system in an exemplary single ring optical packet-switched network, consistent with certain disclosed embodiments of the present invention.

FIG. 6 shows an exemplary schematic view of the MAC mechanism of the network node system in an exemplary single ring optical packet-switched network, consistent with certain disclosed embodiments of the present invention. As shown in FIG. 6, single ring optical packet-switched network node 600 may use, for example, a fixed all-optical download filter 660a to filter out control wavelength $\lambda_0$, translates the optical signal into electrical signal through receiver 620, and interprets the control signal via MAC processor 650. When the control signal is interpreted and processed, the data packet is still transmitted in the optical domain. After obtaining the control message, i.e., the state information of W data channels $\lambda_1, \ldots, \lambda_W$, MAC processor 650 determines whether to perform data packet uploading, downloading, erasing, and so on, for example, using a tunable transmitter 680 to upload, a tunable receiver 670 to download, and a slot eraser 630 to erase. The new control message is recorded in the corresponding mini slots of the control channel and uploaded by a transmitter 610. Then, multiplexer 660b multiplexes the control signal carried by $\lambda_0$ and data channels $\lambda_1, \ldots, \lambda_W$ to the optical fiber.

For the data packets already received by the receiving node and unnecessary to keep in the network, the server node may use slot eraser 630 to clean out the slot for reuse.

If a double ring optical packet-switched network is used, network fault protection capability may be provided, with a ring used as a working ring and the other ring used as the backup ring. When an error occurs in the working ring, the two neighboring nodes at the malfunction point may switch the signal from the working ring to the backup ring without affecting the other nodes. Logically, two rings are used as one ring. An exemplary embodiment only requires an additional pair of optical switches, such as a pair of 2×2 optical switches, with one optical switch placed before filter 660a and the other optical switch placed after multiplexer 660b. For the two linked neighboring nodes, the optical switch may switch the signal from working ring to the backup ring. The operation of the MAC protocol is identical to the previous embodiment, and thus is omitted here.

Based on the aforementioned network architecture and MAC and the following fair bandwidth allocation mechanism, the MAC apparatus of the present invention can guarantee the quality of service. In other words, the MAC apparatus includes, in addition to a MAC processor 650, a bandwidth allocation module. The bandwidth allocation designed by the bandwidth allocation module must not only satisfy the service demands of the signal amount of each node on the ring packet-switched network, but also satisfy the service demands highly sensitive to the time latency. Furthermore, the network bandwidth obtained by the node of the network will not change drastically because of the location of the node, so as to achieve the fairness requirements.

Before determining how to process the data channel, it is necessary to understand the basic problem and the constraint of data access on the multi-wavelength ring network, in other words, the receiver-contention problem and the vertical access constraint. Because an ordinary node has only a tunable receiver for receiving data and a tunable transmitter for transmitting data, the receiver-contention problem will occur when a time slot has more than one packet transmitted to the same destination. This is because the destination node has only one tunable receiver; therefore, the destination node cannot receive packets of two different wavelengths. Similarly, with only one tunable transmitter, the ordinary node may only transmit a packet at a time. In other words, when receiving and transmitting data packets in a multi-wavelength ring network, although W slots of the W data channels are available at any given time (see FIG. 5 for the W slots), it is not allowed to have two or more slots of the W slots to carry packets to the same destination. Otherwise, the data packets will be lost because the destination node has only one tunable receiver and cannot receive multiple packets simultaneously. This specific constraint is called vertical access constraint. The word vertical indicates the W slots of the same time frame.

The following describes the design of the bandwidth allocation module of the present invention. This exemplary embodiment shows the determination of transmission quota of each node to guarantee the basic bandwidth. For the node with un-used quota in the previous cycles within the window, the node may receive an extra quota called credit. Therefore, the maximum number of packets that a node may transmit in a cycle is the basic guaranteed quota plus the accumulated credit. This exemplary embodiment of the bandwidth allocation module is called probabilistic quota plus credit (PQOC) mechanism.

Figure 7:
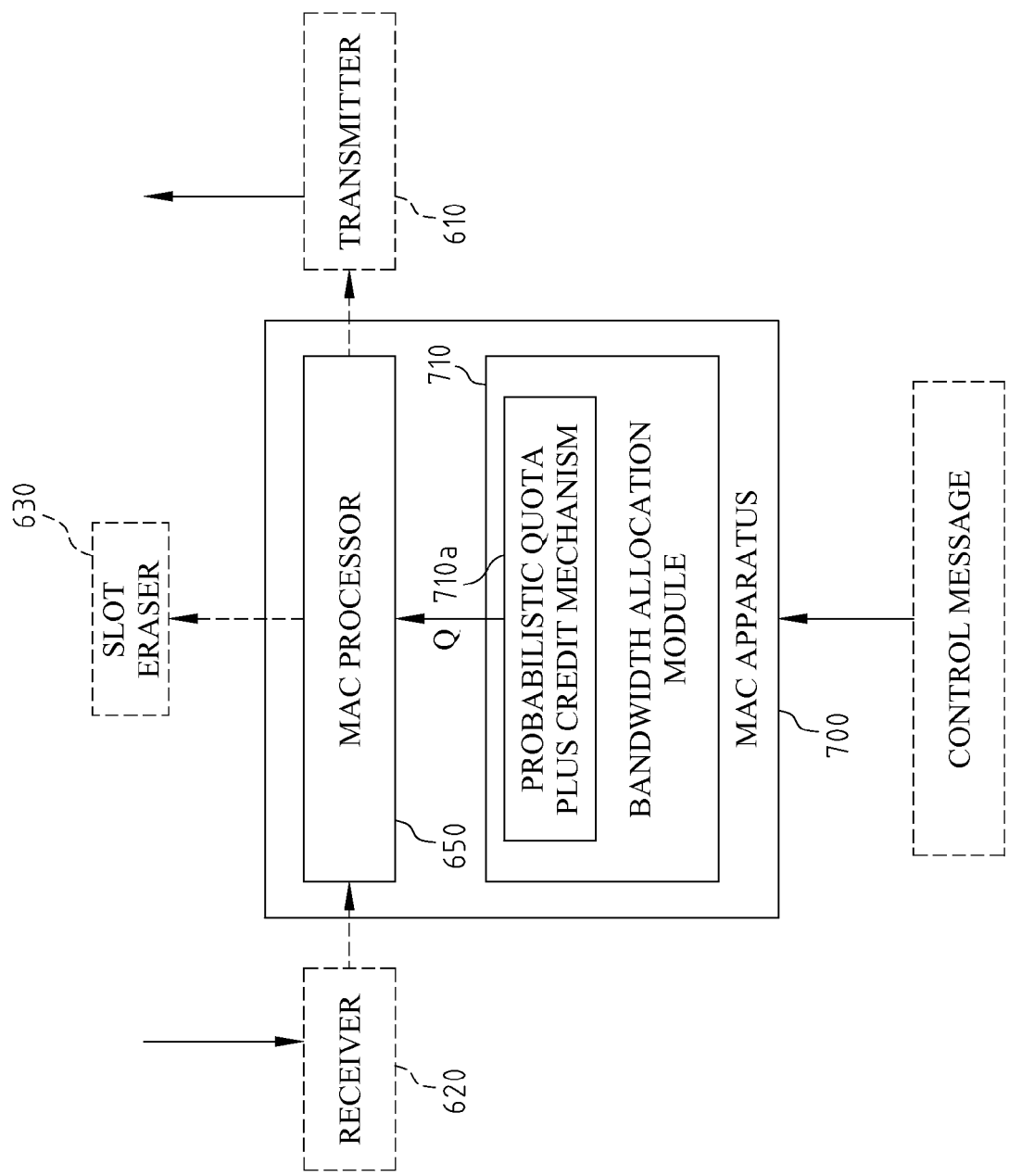
FIG. 7 shows a schematic view of an exemplary MAC apparatus, consistent with certain disclosed embodiments of the present invention.

FIG. 7 shows a schematic view of an exemplary MAC apparatus, consistent with certain disclosed embodiments of the present invention. As shown in FIG. 7, MAC apparatus 700 is applied to a node of an optical packet-switched network, such as node system 600 of the single ring optical packet-switched network.

MAC apparatus 700 may include aforementioned MAC processor 650 and a bandwidth allocation module 710. Bandwidth allocation module 710 determines the transmission quota Q of each node of the optical packet-switched network by using a PQOC mechanism 710a-4e, and dynamically adjusts the un-used bandwidth of each node on the network. MAC processor 650 determines the uploading, offloading, erasing of a plurality of data channels $\lambda_1, \ldots, \lambda_w$, and updates the corresponding content in the control message through the control message carried by control channel $\lambda_0$.

Refer to the structure of the cycle and slot of FIG. 5. In the $k+1^{th}$, $k^{th}$ or $k-1^{th}$ cycle, each cycle has a fixed number of slots. Basically, PQOC mechanism allows the maximum amount of data transmission for each node in a cycle.

Theoretically, if all the usable slots are uniformly and fairly allocated to each node, the system will achieve the maximum throughput. However, if the transmitting node captures the available slot sequentially for carrying the data packets, the unfair output may still occur, especially when the system load is very high. The main reason is that in each cycle, if the upstream nodes in the network capture the slots for transmission sequentially, the upstream nodes will use the available slots in the front, and the remaining un-used slots will appear at the end of the cycle and vertically allocated in different wavelengths. Because of the aforementioned vertical access constraint, the downstream nodes in the network cannot transmit the maximum amount of data packets even the transmission quota allows. Thus, the unfairness for the downstream nodes occurs. To avoid the aforementioned unfairness, when MAC processor 650 intends to transmit, not only MAC processor 650 must check whether the node still has remaining transmission quota to use, MAC processor 650 must also use the probability to determine whether to allow the node to transmit data in this available slot. Through this mechanism, the above unfairness can be avoided.

The configuration of probability may be, for example, the maximum transmission amount divided by the length of a cycle. In this manner, the transmission within a cycle is random, not sequential; which is unfair to the downstream node. This also allows the available bandwidth to be randomly distributed within a cycle. The transmission quota and the credit computation will be described later.

In PQOC mechanism, a node is allowed to pass the un-used transmission quota to the downstream nodes when the node has less data to transmit than the maximum quota allows. By passing the un-used transmission quota to the downstream nodes, the node will obtain credit. The credit will allow the node to transmit more data within a cycle than originally allowed by the transmission quota. The credit mechanism allows the un-used bandwidth to be utilized by the downstream nodes. When configuring the cycle length and the remaining credit window size, the shorter the cycle, the better the bandwidth sharing; while the larger the number of the window size, the better for the transmission of different clusters.

Figure 8:
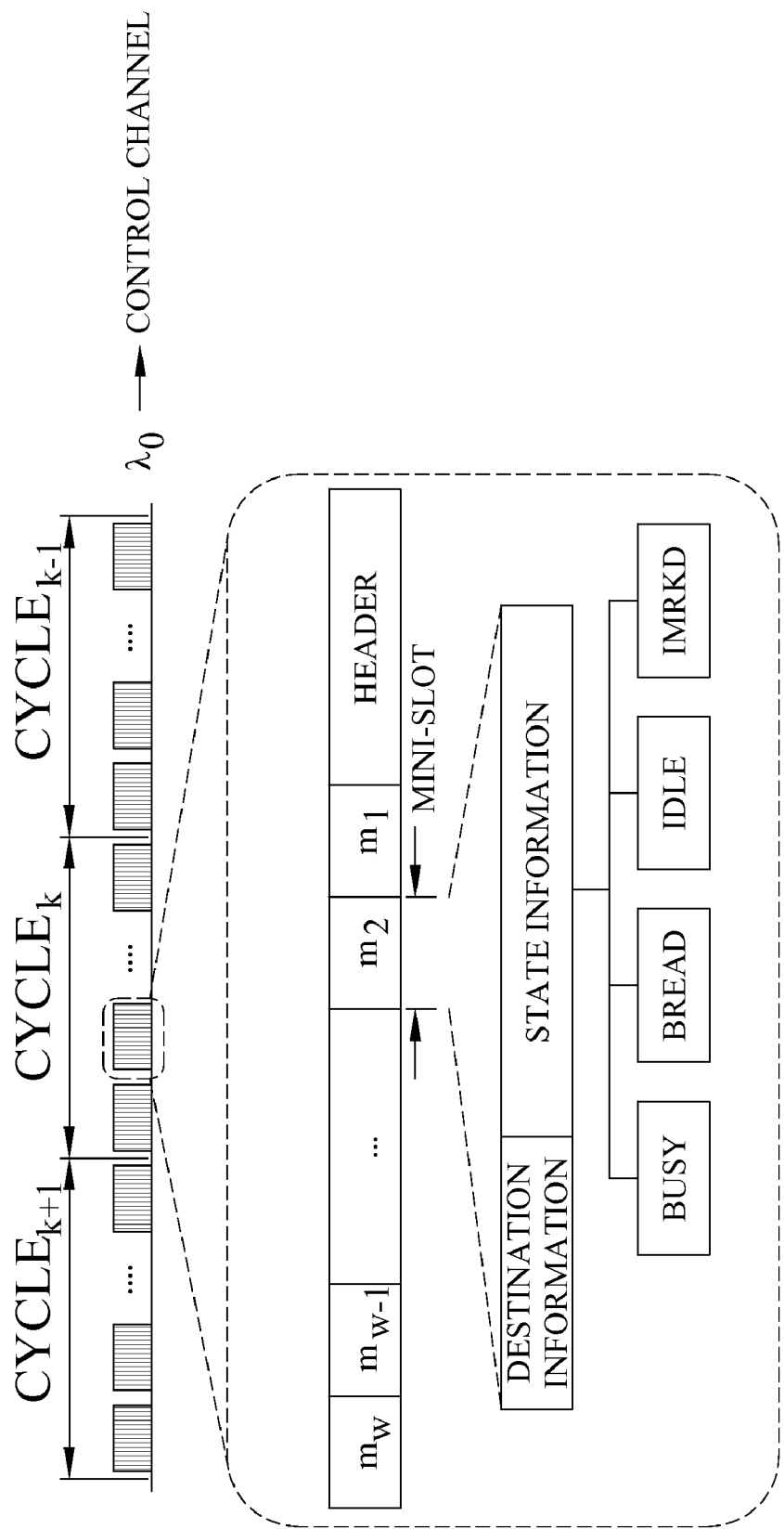
FIG. 8 shows a schematic view of an exemplary data structure of the slot of control channel, consistent with certain disclosed embodiments of the present invention.

In PQOC mechanism, the data structure of the slot of the control channel is shown in FIG. 8. With the control channel, the operation of PQOC mechanism is simple. As aforementioned, each slot of the control channel includes a header and W mini-slots. The W mini-slots include respectively the state of the W data channels within the slot and the destination of the data packet.

In the exemplary data format of FIG. 8, the header includes the slot synchronization information to position the starting of the slot. The PQOC mechanism defines four data channel states: BUSY, BUSY/READ (BREAD), IDLE and IDLE MARKED (IMRKD).

When a node intends to transmit data, the node needs to check whether there is remaining transmission quota to be used. The node must also use probability to determine whether the transmission is allowed. Therefore, in the PQOC mechanism, if a node is allowed to transmit data within a slot, the node must find an IDLE slot or IMRKD slot. If no IDLE slot is available, the node is allowed to transmit data unconditionally within the next slot, in other words, no need to use the probability in determining the permission.

When the destination node receives the transmitted data, the state information will be changed from BUSY to BREAD. The next server node will clear all the data on the data channels with the state information as BREAD and change the state information from BREAD to IDLE so that the bandwidth may be re-used.

When a node has un-used transmission quota, the PROC mechanism will find the same number of IDLE slots and change the state information of these slots from IDLE to IMRKD. The IMRKD slots indicate that these slots are the un-used bandwidth from the upstream nodes. If the downstream nodes have credit accumulated from the previous windows, the downstream nodes may use the un-used IMRKD slots. When the node uses the IMRKD slots to transmit data, the state information is changed from IMRKD to BUSY.

Figure 9:
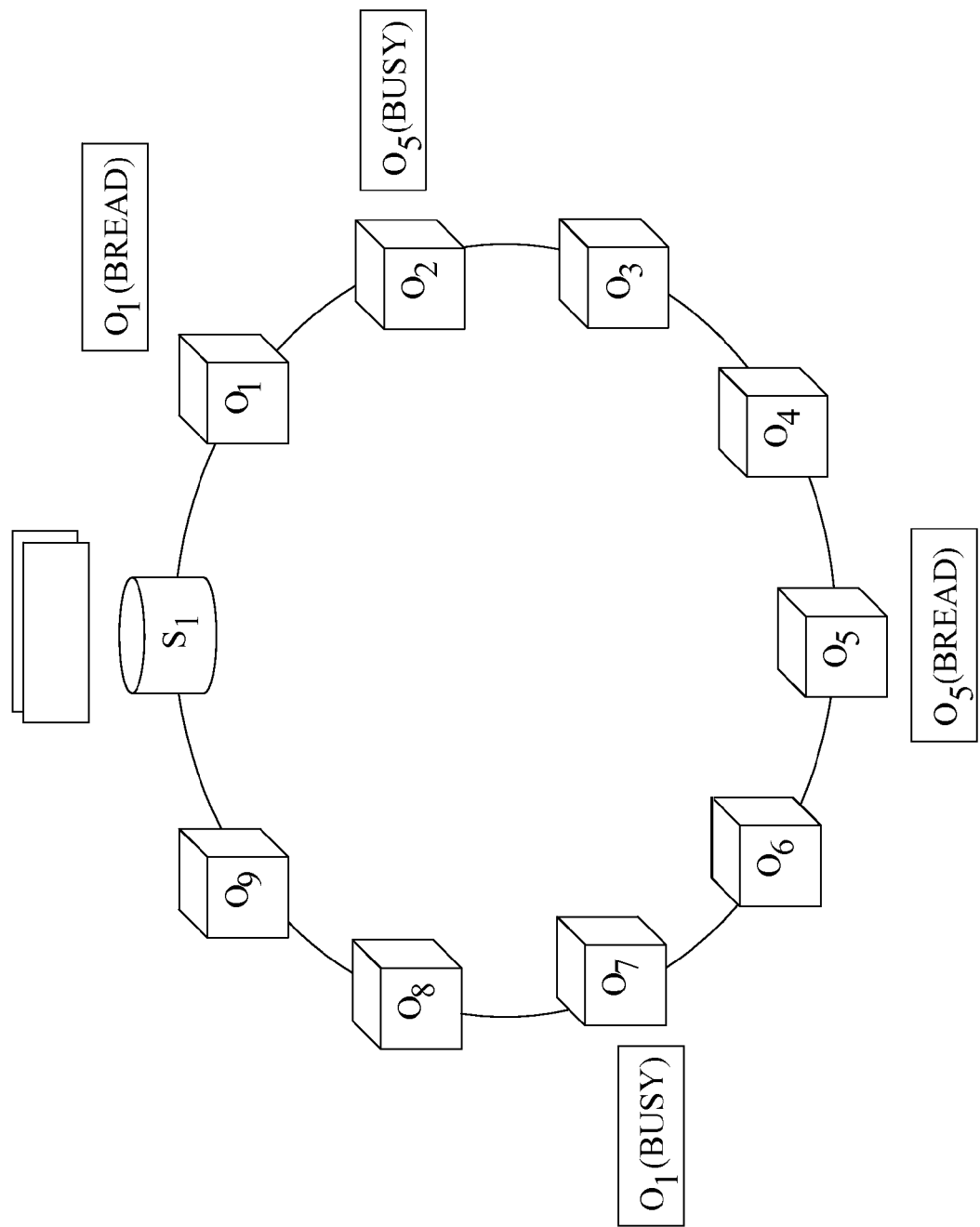
FIG. 9 shows an exemplary schematic view illustrating the data flow of the network nodes, consistent with certain disclosed embodiments of the present invention.

The following describes the exemplary computation of the probabilistic quota. Assume that the network has S server nodes $S_1, S_2, \ldots, S_S$. Server nodes $S_1, S_2, \ldots, S_S$ divide the network into S sections called, section 1 to section S. Each section includes a plurality of nodes, including ordinary nodes and a corresponding server node. For the simplicity of description, the server node of each section is defined as the most downstream node of the section. As shown in the exemplary data flow of FIG. 9, section 1 includes 10 nodes, including 9 ordinary nodes $O_1, \ldots, O_9$, and a corresponding server node $S_1$.

In this manner, section 1 starts with the nodes after server node $S_S$ and ends with server node $S_1$, section k starts with the nodes after server node $S_{k-1}$ and ends with server node $S_k$, and so on. Therefore, a network with N nodes has the equation of $$N = \sum_{k=1}^{S} N_k,$$

where $N_k$ is the number of nodes in section k.

After node $O_2$ (source) transmits data to node $O_5$ (destination), the read data packet (state as BREAD) arrives at server node $S_1$, and slot eraser 630 of server node $S_1$ will erase the data, and change the state of the slot to IDLE.

Another scenario is that when node $O_7$ (source) transmits data to node $O_1$ (destination), the transmitted data (state as BUSY) will pass server node $S_1$. However, because the data is not yet read by destination node $O_1$, server node $S_1$ will not erase the data packet. When the packet arrives at destination node $O_1$, the state will be changed to BREAD, and continue the transmission until passing server node $S_1$ for the second time; at that point, the packet will be erased.

When the state information on the bandwidth is changed to IDLE, the bandwidth becomes available. For a server node, each slot may be classified into two types. The first is the available bandwidth (AB), and the other is used bandwidth (UB). AB indicates an un-occupied slot, or a slot that has been read and erased. UB indicates a slot currently carrying data and not passing the destination node yet. The example is shown in FIG. 10.

Figure 10:
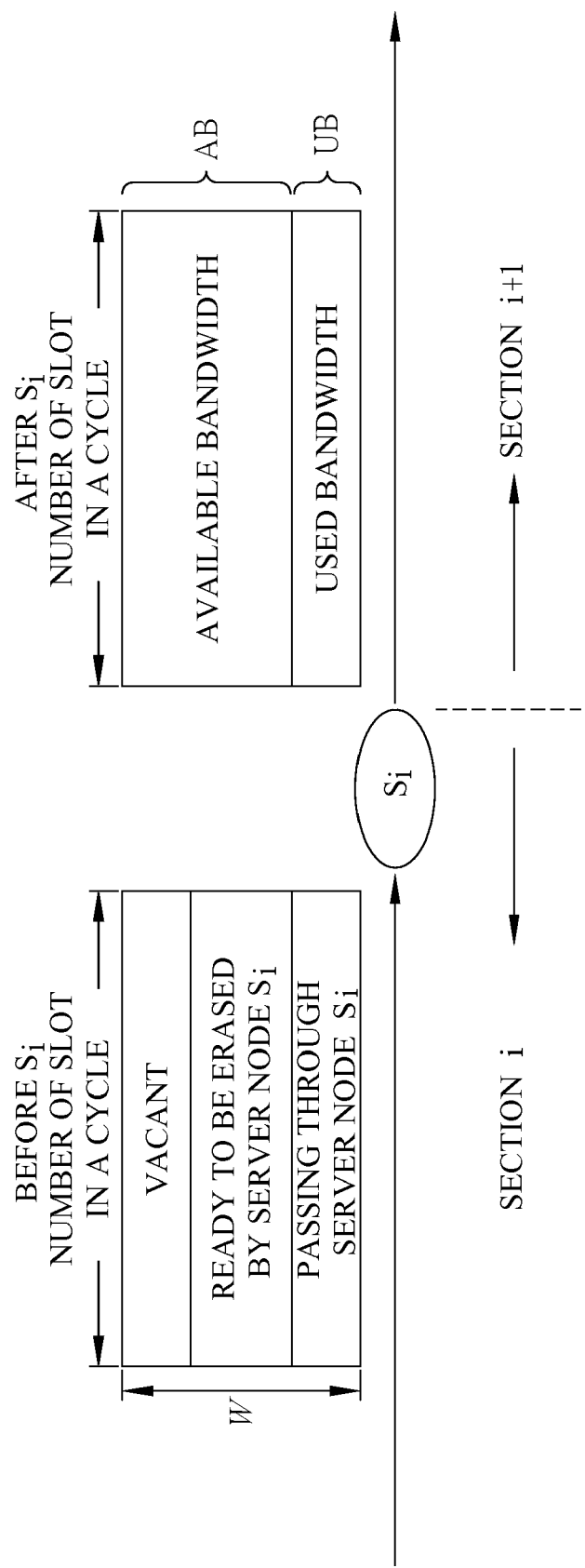
FIG. 10 shows an exemplary schematic view illustrating the changes in the data bandwidth before and after a server node, consistent with certain disclosed embodiments of the present invention.

In the example of FIG. 10, the left side shows the states of W data channels $\lambda_1, \ldots, \lambda_W$ while in section i and before passing the last node (server node $S_i$). The W data channels may be categorized as vacant (IDLE, IMRKD), to be erased by server node $S_i$ (BREAD), and passing through server node $S_i$ (BUSY).

The right side shows the states of W data channels $\lambda_1, \ldots, \lambda_W$ after passing the last node (server node $S_i$) while in section i+1. The W data channels may be categorized as AB and UB, where AB is the vacant data channels in section i plus the data channels erased by server node $S_i$ for re-use.

In PQOC mechanism, the embodiment for determining the transmission quota for each node may use the mean of the AB in section i+1 divided by the number of nodes in section i+1. In other words, in section b, the transmission quota $Q_b$ of each node may be $Q_b = \overline{AB_b}/N_b$, where $\overline{AB_b}$ is the mean of the AB passing server node $S_{b-1}$, and $N_b$ is the number of nodes in section b. Mean $\overline{AB_b}$ is related to the signal distribution of the destination nodes, and may be obtained by subtracting the mean UB from CW, the total slots of W data channels $\lambda_1, \ldots, \lambda_W$ in a cycle, where C is the number of slots in a cycle pre-determined by the system.

To simplify the description, the exemplary embodiment of the present invention assumes that the probability of the packet arriving at each node is the same $p_A$ (including server node), and the remaining $1-p_A$ ($=p_S$) is the probability that the packet arriving to the other server nodes. If $p_S=0$, the probability that the packet arrives at s server node is the same as the probability the packet arrives at an ordinary node. That is, all the nodes in the network have the same signal distribution.

$\overline{AB_b}$ may be obtained by subtracting the mean UB from the total slots in a cycle. The following analyzes the mean UB passing through server node $S_b$. The contribution to UB comes from two parts. The first part is the signal from a node of a section in the network to the other nodes in the same section, and the second part is the signal from a section to another section.

For the first part, take the mean UB contribution from section k to server node b as example, the available slot amount of section k is $Q_k \cdot N_k$; therefore, the signal amount from section k to section k is $(Q_k \cdot N_k \cdot p_S/S)+(Q_k \cdot N_k \cdot p_A \cdot N_k/N)$. Among the above signal amount, the amount of $(Q_k \cdot N_k \cdot p_S/S)+(Q_k \cdot N_k \cdot p_A \cdot N_k/2N)$ will be erased by the server node of section k, i.e., server node $S_k$, where $Q_k \cdot N_k \cdot p_A \cdot N_k/2N$ is the signal amount from the upstream nodes of section to the downstream nodes of section k; thus, may be erased by server node $S_k$. The remaining $Q_k \cdot N_k \cdot p_A \cdot N_k/2N$ is the signal amount from the downstream nodes of section k to the upstream nodes of section k. These packets will pass through the entire cycle; thus, will be treated as UB to section b.

For the second part, take section b+2 as an example. For the packets originated from section b+2, if the destination node is sections b and b+1, the slots will be treated as UB by server node $S_{b-1}$ and section b. Therefore, the mean UB is $Q_{b+2} \cdot N_{b+2} \cdot ((p_S/S)+(p_A \cdot N_b/N))+Q_{b+2} \cdot N_{b+2} \cdot ((p_S/S)+(p_A \cdot N_{b+1}/N))$.

Finally, take all the sections into account, the following result may be obtained:

$$\overline{AB_b} = CW - \sum_{k=1}^{S} \left\{ Q_k N_k \left( \frac{p_A N_k}{2N} + U_k \right) \right\}, \quad (1)$$

where $$U_k = \begin{cases} \sum_{m=b}^{k-1} \left( \frac{p_S}{S} + \frac{p_A N_m}{N} \right), & \text{if } b \leq k \leq S \\ \sum_{m=b}^{S} \left( \frac{p_S}{S} + \frac{p_A N_m}{N} \right) + \sum_{n=1}^{k-1} \left( \frac{p_S}{S} + \frac{p_A N_n}{N} \right), & \text{if } 1 \leq k < b \end{cases}$$

where, C is the total slots in a cycle, W is the number of data channels. Because equation (1) includes more than one variable ($\overline{AB_b}$ and $Q_k$'s), equation (1) is unsolvable. However, in a general network, the server nodes are uniformly distributed in the network. Therefore, $N_1=N_2=N_3=\ldots=N_S=N/S$. Hence, the equivalent transmission quota Q may be obtained. That is, for all the nodes, $Q=\overline{AB}/(N/S)$. Equation (1) may be rewritten as:

$$\overline{AB} = C \times W - \sum_{k=1}^{S}\left\{Q \cdot \frac{N}{S} \cdot \left(\frac{p_A}{2S} + \frac{k-1}{S}\right)\right\} \quad (2)$$

Based on this, transmission quota Q may be expressed as:

$$Q = \frac{C \times W}{N}\left(\frac{2S}{S - p_S + 2}\right) \quad (3)$$

Figure 11:
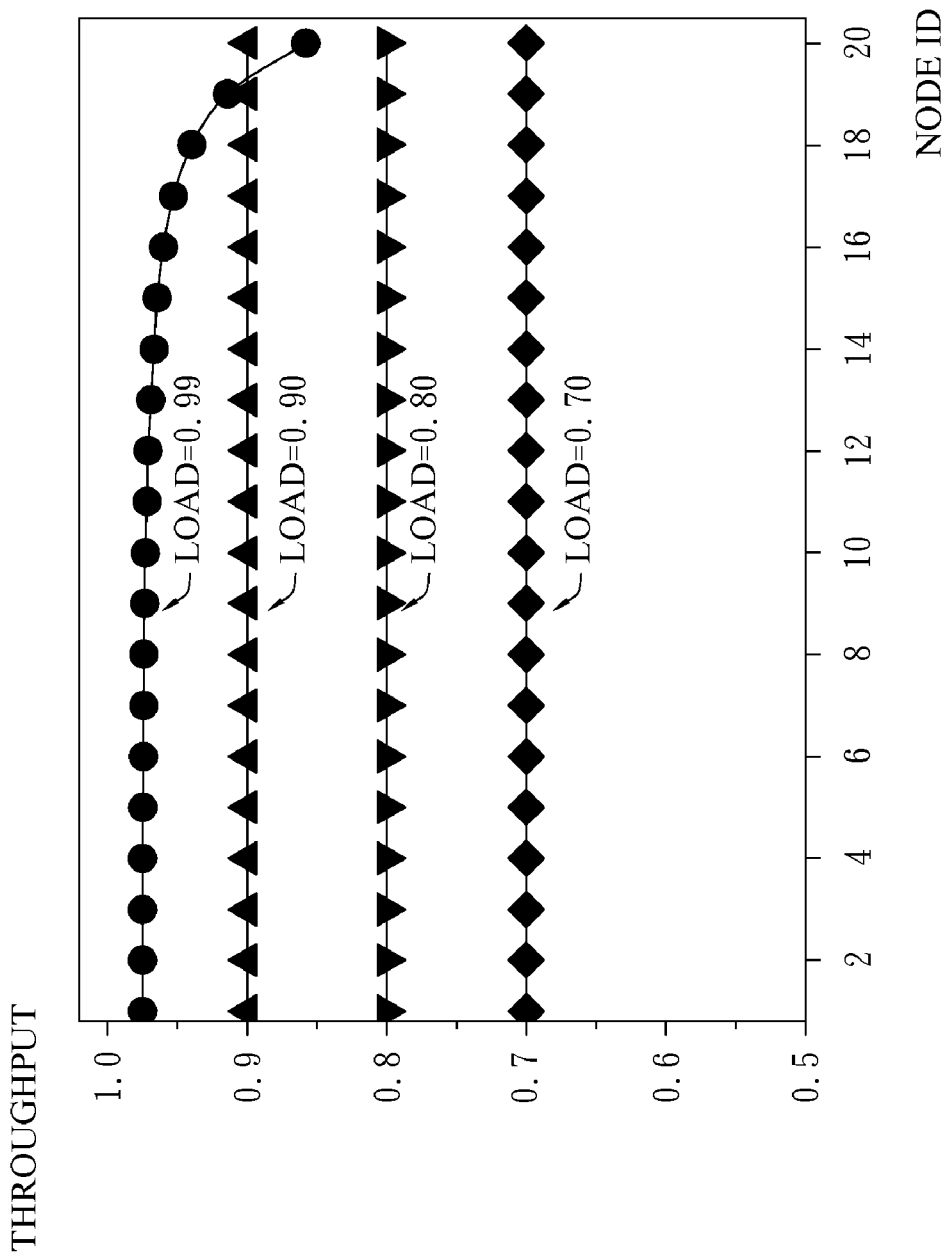
FIG. 11 shows an exemplary simulated result of the PQOC mechanism under different loads, consistent with certain disclosed embodiments of the present invention.
Figure 12A:
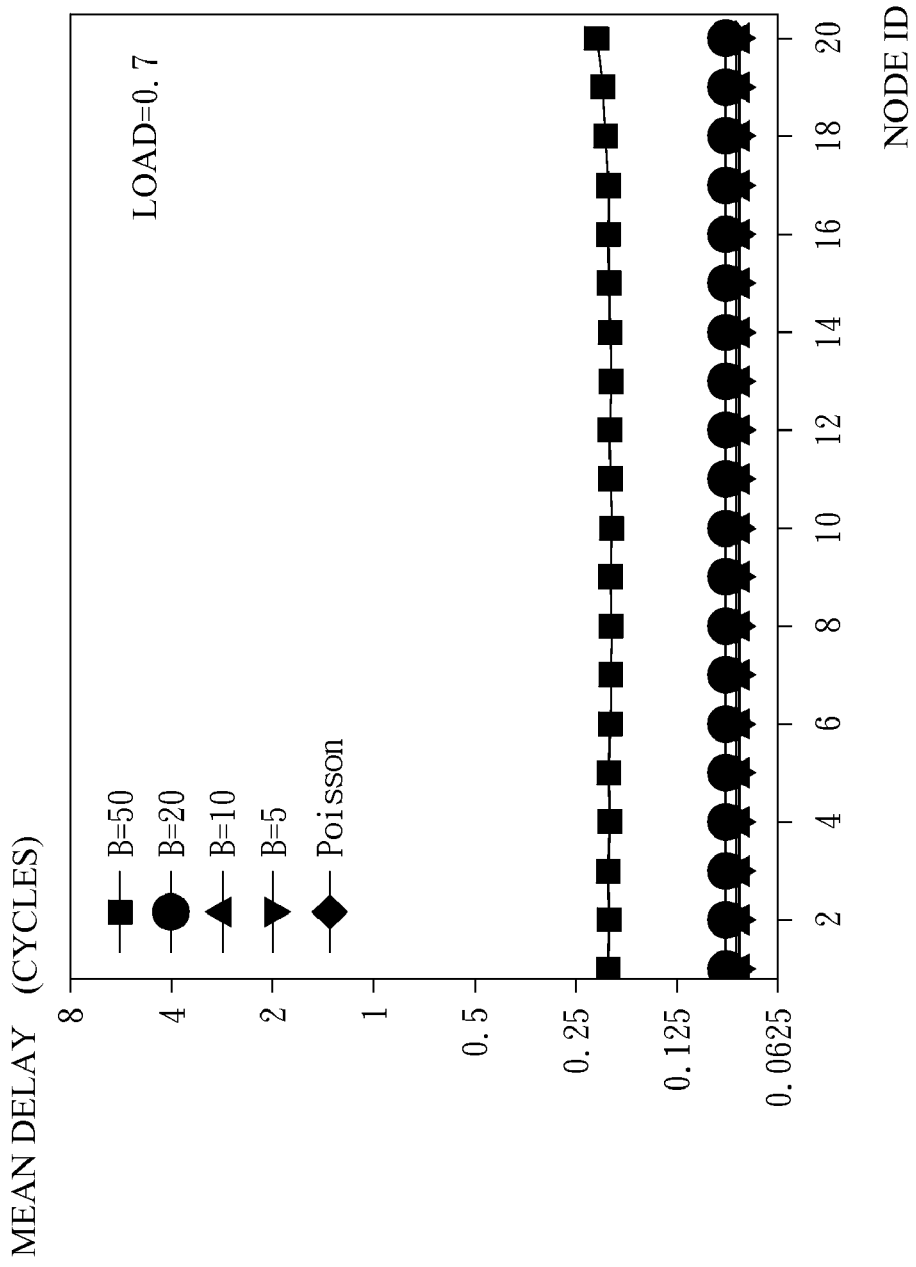
FIGS. 12A-12B show exemplary simulated results of the node delay under the condition loads of 0.7 and 0.9 respectively, where burstiness increasing from 1, 5, 10, 20 to 50, consistent with certain disclosed embodiments of the present invention.
Figure 12B:
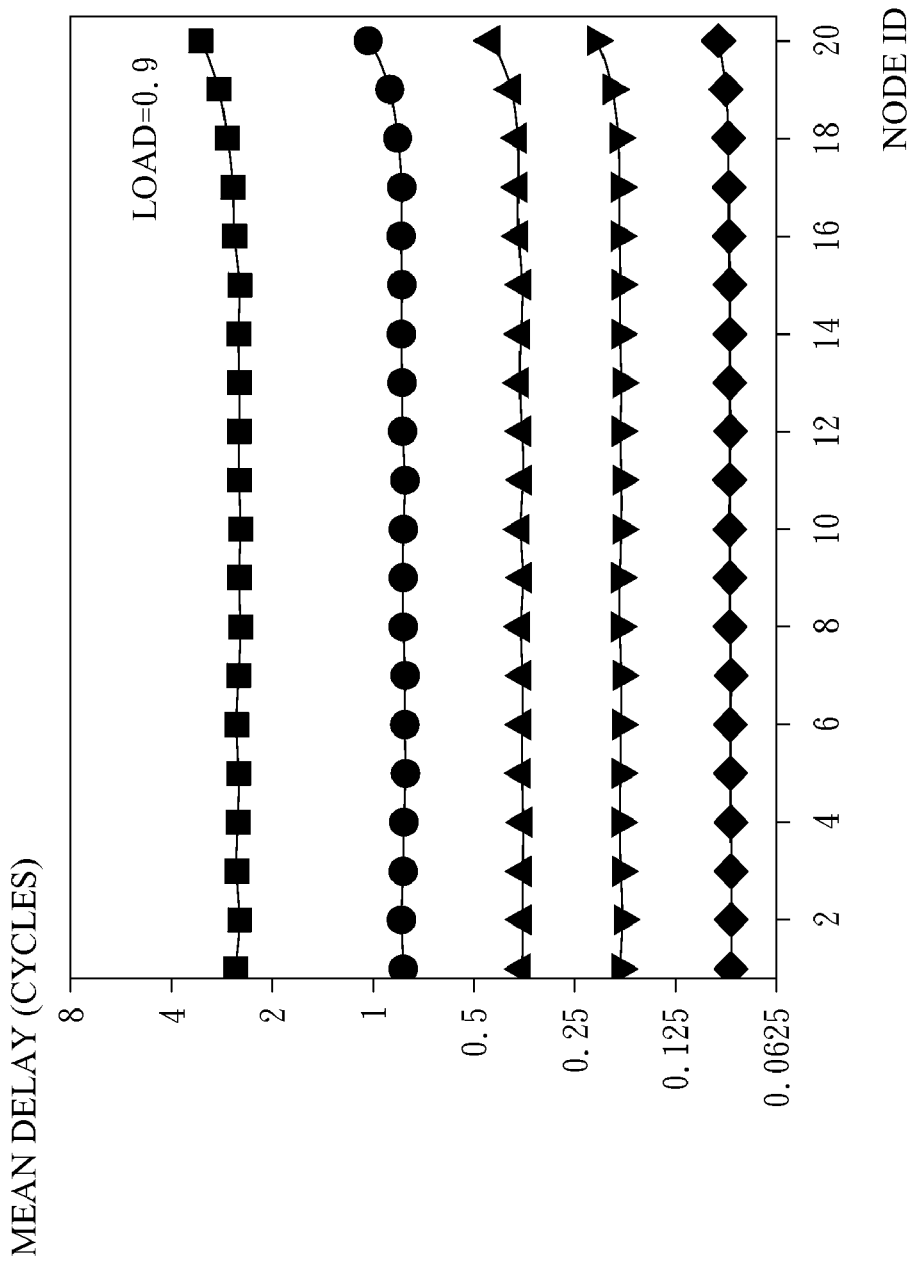

FIG. 11, FIG. 12A and FIG. 12B are the simulated performance of the PQOC mechanism, with the following simulation parameters: ring network having 20 nodes, including 19 ordinary nodes and a server node, total 9 wavelengths, including 8 data channels and 1 control channel, 1 ring=20 cycles, a cycle=100 slots, the window size for credit is 10 cycles.

In FIG. 11, the X-axis represents the ID of 20 nodes, and Y-axis is the corresponding throughput. In the figures under different loads (=0.99, 0.90, 0.80, 0.70) in FIG. 11, the throughput is 100% transmission when the system load is less than 0.9. This is because the PQOC mechanism is effective. When the network load is close to 100% (e.g. 0.99), the throughput of the downstream nodes is slightly affected due to vertical access constraint.

FIG. 12A and FIG. 12B analyze the PQOC mechanism performance in terms of delay. When the load is 0.7 and 0.9 respectively, the burstiness increases from 1, 5, 10, to 50, with X-axis showing the ID of 20 nodes and Y-axis showing the corresponding mean delay. The unit of delay is cycle. As shown in FIG. 12A and FIG. 12B, although under different burstiness, other than normal increase in queuing of packets inside a node caused by burstiness, the inter-node delay and the fairness are only very slightly affected.

Before the system non-saturated load, not only the overall delay is low, the inter-node fairness is also satisfied. Hence, in the lighter load condition, random access may be provided. In the heavier load scenario, superior bandwidth allocation may be provided.

In summary, the exemplary disclosed embodiments of the present invention may provide a MAC mechanism for multiple wavelengths optical packet-switched network and the optical packet-switched network itself. The MAC mechanism determines the transmission quota of each node in the network to guarantee the basic bandwidth. The exemplary disclosed embodiments of the present invention also solve the unfairness among node caused by the position in the network. According to the simulation results, the MAC mechanism allows the optical packet-switched network to achieve the highest throughput, low delay and nearly fair access. The prototype of the present invention proves the feasibility of the present invention.

Although the present invention has been described with reference to the exemplary embodiments, it will be understood that the invention is not limited to the details described thereof Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An apparatus for medium access control (MAC), applicable to an optical packet-switched network, said apparatus comprising:
   a bandwidth allocation module for determining a transmission quota for each node in said optical packet-switched network, dynamically informing downstream nodes of an un-used transmission quota, and allowing said downstream nodes with remaining credit to use un-used bandwidth of upstream nodes by using a probabilistic quota plus credit (PQOC) mechanism; and
   a medium access control (MAC) processor for determining uploading, offloading, and data erasing of a plurality of data channels, and updating corresponding contents in a control message carried by a control channel.

2. The apparatus as claimed in claim 1, wherein said optical packet-switched network includes at least an ordinary node and at least a server node, said ordinary and server nodes are connected by at least an optical fiber, with each of said at least an optical fiber carrying said control channel and said plurality of data channels.

3. The apparatus as claimed in claim 2, wherein said ordinary and server nodes of said optical packet-switched network form a ring network.

4. The apparatus as claimed in claim 2, wherein said apparatus arranges a channel slot structure, said slot structure divides each channel carried in said optical fiber into a plurality of synchronous slots according to time, in each data channel, each slot has a data packet, and each slot in said control channel includes a plurality of mini-slots, said plurality of mini-slots records respectively state information of said plurality of data channels in the same slot.

5. The apparatus as claimed in claim 1, wherein said MAC processor uses a transmitter for uploading, a receiver for offloading and a slot eraser for data erasing.

6. The apparatus as claimed in claim 1, wherein each node of said optical packet-switched network includes a fixed-tuned transmitter and a fixed-tuned receiver for information transmission and receiving on said control channel.

7. The apparatus as claimed in claim 1, wherein each node of said optical packet-switched network includes at least a tunable transmitter and at least a tunable receiver for data transmission and receiving on said plurality of data channels.

8. The apparatus as claimed in claim 1, wherein said control message carried by said control channel includes at least the state information of data packets carried by said plurality of data channels.

9. The apparatus as claimed in claim 4, wherein said bandwidth allocation module classifies said state information of said data channels as BUSY, BUSY/READ (BREAD), IDLE, and IDLE MARKED (IMRKD).

10. An optical packet-switched network, comprising:
    a plurality of ordinary nodes;
    at least a server node; and
    at least an optical fiber, connecting said plurality of ordinary nodes and said at least a server node, each of said at least an optical fiber carrying a control channel for transmitting a control message, and a plurality of data channels for transmitting data packets;
    wherein each node of said network determines a transmission quota of each node, dynamically informing downstream nodes of an un-used transmission quota and allowing said downstream nodes with credit to use bandwidth un-used by upstream nodes via a medium access control (MAC) apparatus with a probabilistic quota plus credit mechanism, and said MAC apparatus determines uploading, offloading, and data erasing of a plurality of data channels, and updates corresponding contents in a control message carried by said control channel.

11. The network as claimed in claim 10, wherein said MAC processor uses a transmitter for uploading, a receiver for offloading and a slot eraser for data erasing.

12. The network as claimed in claim 10, wherein said nodes of said optical packet-switched network form a ring network.

13. A method for medium access control (MAC), applicable to an optical packet-switched network, said method comprising:
  determining a transmission quota of each node in said optical packet-switched network via a probabilistic quota plus credit mechanism;
  dynamically informing downstream nodes of an un-used transmission quota and allowing said downstream nodes with credit to use bandwidth un-used by upstream nodes; and
  determining uploading, offloading, and data erasing of a plurality of data channels, and updating corresponding contents in a control message via said control message carried by a control channel.

14. The method as claimed in claim 13, wherein state information of data packets carried by said plurality of data channels is obtained through said control message carried by said control channel.

15. The method as claimed in claim 13, wherein said probabilistic quota plus credit mechanism at least includes:
  when each node of said optical packet-switched network intends to transmit data, the node checks whether a remaining transmission quota exists and whether the node is allowed to transmit data by using probability.

16. The method as claimed in claim 13, wherein said probabilistic quota plus credit mechanism at least includes:
  when a node has less than a maximum transmission quota for transmission, the node gives an un-used transmission quota to downstream nodes, and obtains an equivalent credit of said un-used transmission quota.

17. The method as claimed in claim 13, wherein the determination of said transmission quota at least includes:
  computing said transmission quota of each node of said optical packet-switched network, said transmission quota being related to the mean of available bandwidth in a cycle and the number of server nodes of said optical packet-switched network, wherein said optical packet-switched network has a plurality of ordinary nodes and at least a server node.

18. The method as claimed in claim 17, wherein each of said at least a server node includes a slot eraser to erase data that has been received by a destination node and no longer requires to be kept in said optical packet-switched network.

19. The method as claimed in claim 13, wherein a cycle is a fixed number of slots.

* * * * *